United States Patent
Markyvech et al.

(10) Patent No.: US 8,988,220 B2
(45) Date of Patent: Mar. 24, 2015

(54) APPARATUS AND METHOD FOR DETECTING AN INTRUDER INSIDE A VEHICLE

(75) Inventors: Craig R. Markyvech, Romulus, MI (US); Clark E. McCall, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 813 days.

(21) Appl. No.: 12/019,775

(22) Filed: Jan. 25, 2008

(65) Prior Publication Data

US 2009/0189751 A1    Jul. 30, 2009

(51) Int. Cl.
| | | |
|---|---|---|
| G08B 13/00 | (2006.01) |
| B60D 1/28 | (2006.01) |
| B60K 28/00 | (2006.01) |
| G06F 15/02 | (2006.01) |
| G01G 19/08 | (2006.01) |
| B60C 23/00 | (2006.01) |
| B60R 25/10 | (2013.01) |

(52) U.S. Cl.
CPC ..... *B60R 25/1004* (2013.01); *B60R 2025/1013* (2013.01)
USPC ........ 340/541; 340/565; 340/443; 340/573.4; 340/686.1; 340/457; 180/271; 180/272; 180/290; 702/174; 702/173; 701/2; 701/5

(58) Field of Classification Search
USPC .............. 340/457, 573.4, 686.1, 426.24, 666, 340/438, 522; 180/271, 273, 2
See application file for complete search history.

(56) References Cited

U.S. PATENT DOCUMENTS

| | | | | |
|---|---|---|---|---|
| 5,544,057 | A * | 8/1996 | Matsuoka ....................... 701/20 |
| 6,025,563 | A * | 2/2000 | Lesesky et al. ................ 177/136 |
| 6,727,823 | B2 * | 4/2004 | Ando et al. ..................... 340/666 |
| 6,870,472 | B2 * | 3/2005 | Gift et al. ....................... 340/457 |
| 7,386,372 | B2 * | 6/2008 | Breed et al. ....................... 701/1 |
| 2006/0044126 | A1 * | 3/2006 | Ho et al. ........................ 340/457 |
| 2006/0217864 | A1 * | 9/2006 | Johnson et al. .................. 701/45 |
| 2008/0021611 | A1 * | 1/2008 | Hiebert et al. ................... 701/37 |
| 2008/0114502 | A1 * | 5/2008 | Breed et al. ........................ 701/2 |

FOREIGN PATENT DOCUMENTS

JP        2001021411 A  *  1/2001  ............. G01G 23/37

* cited by examiner

*Primary Examiner* — Fekadeselassie Girma
(74) *Attorney, Agent, or Firm* — Ingrassia Fisher & Lorenz, P.C.

(57) ABSTRACT

A method and apparatus are provided for detecting an intruder inside a vehicle. The apparatus comprises a load sensor coupled to the vehicle, and a processor. The processor is coupled to the load sensor and is configured to monitor the load in the vehicle after the vehicle is vacated and locked and to determine if the load in the vehicle changes by more than a predetermined threshold.

12 Claims, 2 Drawing Sheets

APPARATUS AND METHOD FOR DETECTING AN INTRUDER INSIDE A VEHICLE

FIELD OF THE INVENTION

The present invention generally relates to vehicle security systems, and more particularly relates to an apparatus and method for detecting an intruder inside a vehicle.

BACKGROUND OF THE INVENTION

An unoccupied vehicle may be targeted by an intruder. Without a reliable method for detecting the presence of an intruder, the driver has no indication of their presence until the driver is inside the vehicle.

One method for detecting an intruder inside a vehicle involves sensing the vibrations produced by the intruder's heartbeat. However, this type of detection technique may be subject to false alarms and delays due to interference caused by ambient noise (e.g., seismic, wind, etc.). Further, detecting the vibration caused by an intruder's heartbeat requires very sensitive equipment that is not typically included on standard vehicles.

Accordingly, it is desirable to have an apparatus for detecting an intruder inside a vehicle and alerting the driver before the driver enters the vehicle. It is further desirable to have an apparatus that can reliably detect the presence of an intruder inside a vehicle, without generating a large number of false alarms. Furthermore, other desirable features and characteristics of the present invention will become apparent from the subsequent detailed description of the invention and the appended claims, taken in conjunction with the accompanying drawings and this background of the invention

BRIEF SUMMARY OF THE INVENTION

An intruder detection device for a vehicle is provided, comprising a load sensor, coupled to a vehicle, and a processor. The processor is coupled to the load sensor and configured to monitor the load in the vehicle after the vehicle is vacated and locked and determine if the load in the vehicle changes by more than a predetermined threshold.

A method is provided for detecting an intruder inside a vehicle. The method comprises monitoring the load in the vehicle after the vehicle is vacated and locked and determining if the load in the vehicle changes by more than a predetermined threshold.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

Figure 2:
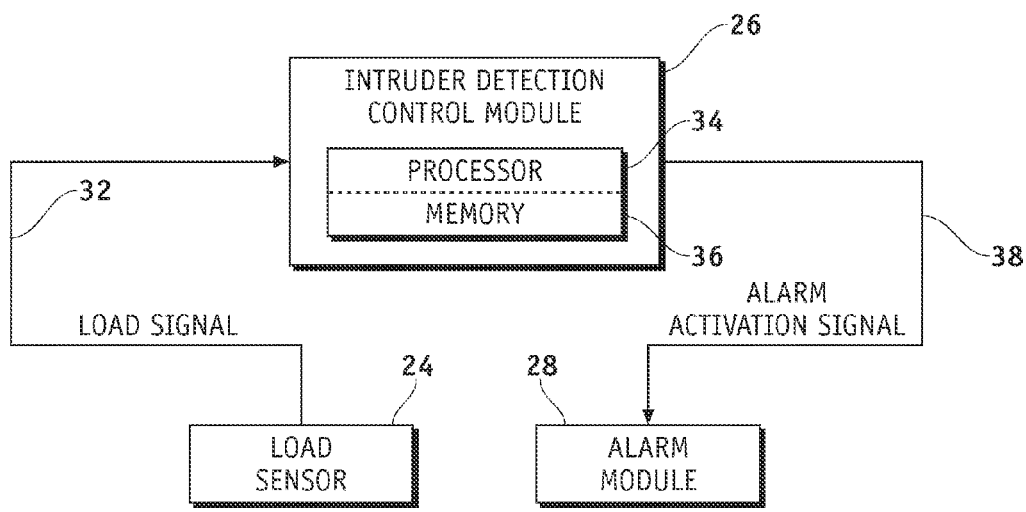
FIG. 2 is a block diagram of a device for detecting an intruder inside a vehicle, according to a first embodiment of the invention.
Figure 3:
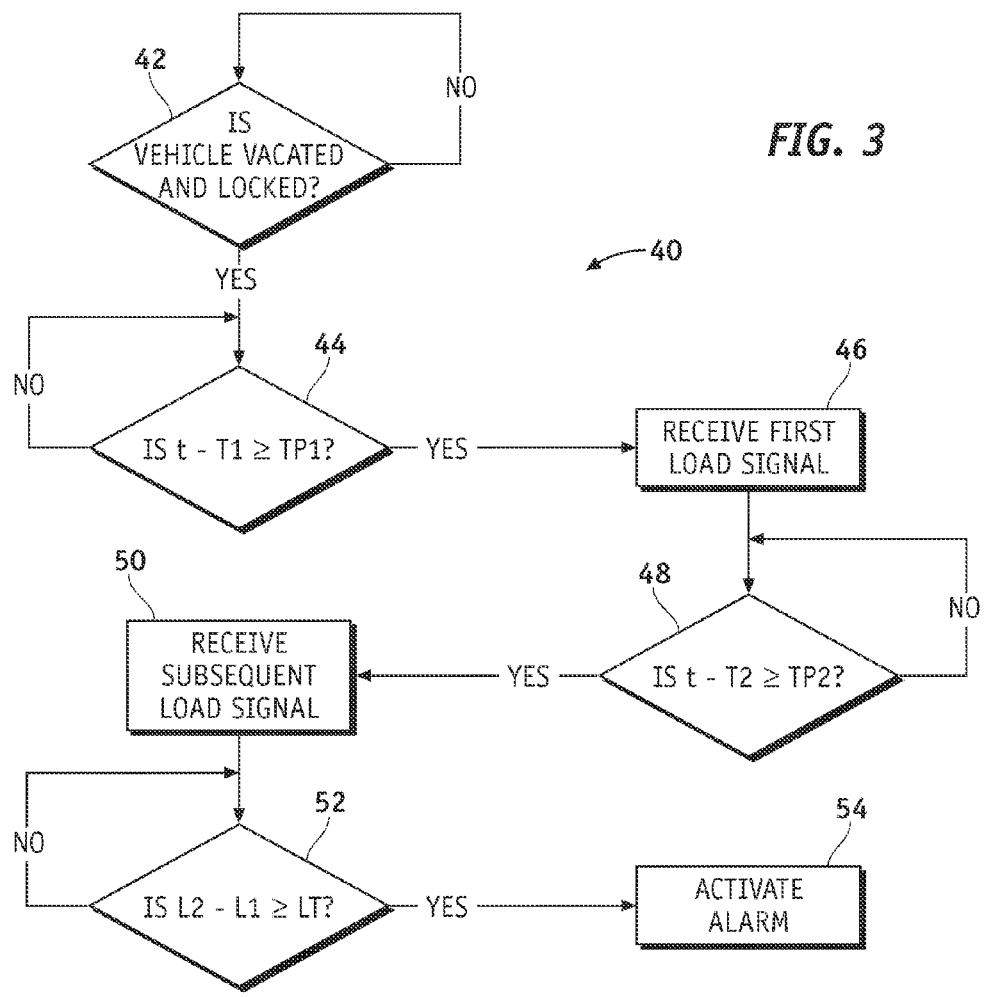
FIG. 3 is a flow chart of a method for detecting an intruder inside a vehicle.

The following detailed description of the invention is merely exemplary in nature and is not intended to limit the invention or the application and uses of the invention. Furthermore, there is no intention to be bound by any theory presented in the preceding background of the invention or the following detailed description of the invention. Although the diagrams shown herein depict example arrangements of elements, additional intervening elements, devices, features, or components may be present in an actual embodiment. It should also be understood that FIGS. 1-3 are merely illustrative and, particularly with respect to FIG. 1, may not be drawn to scale.

Figure 1:
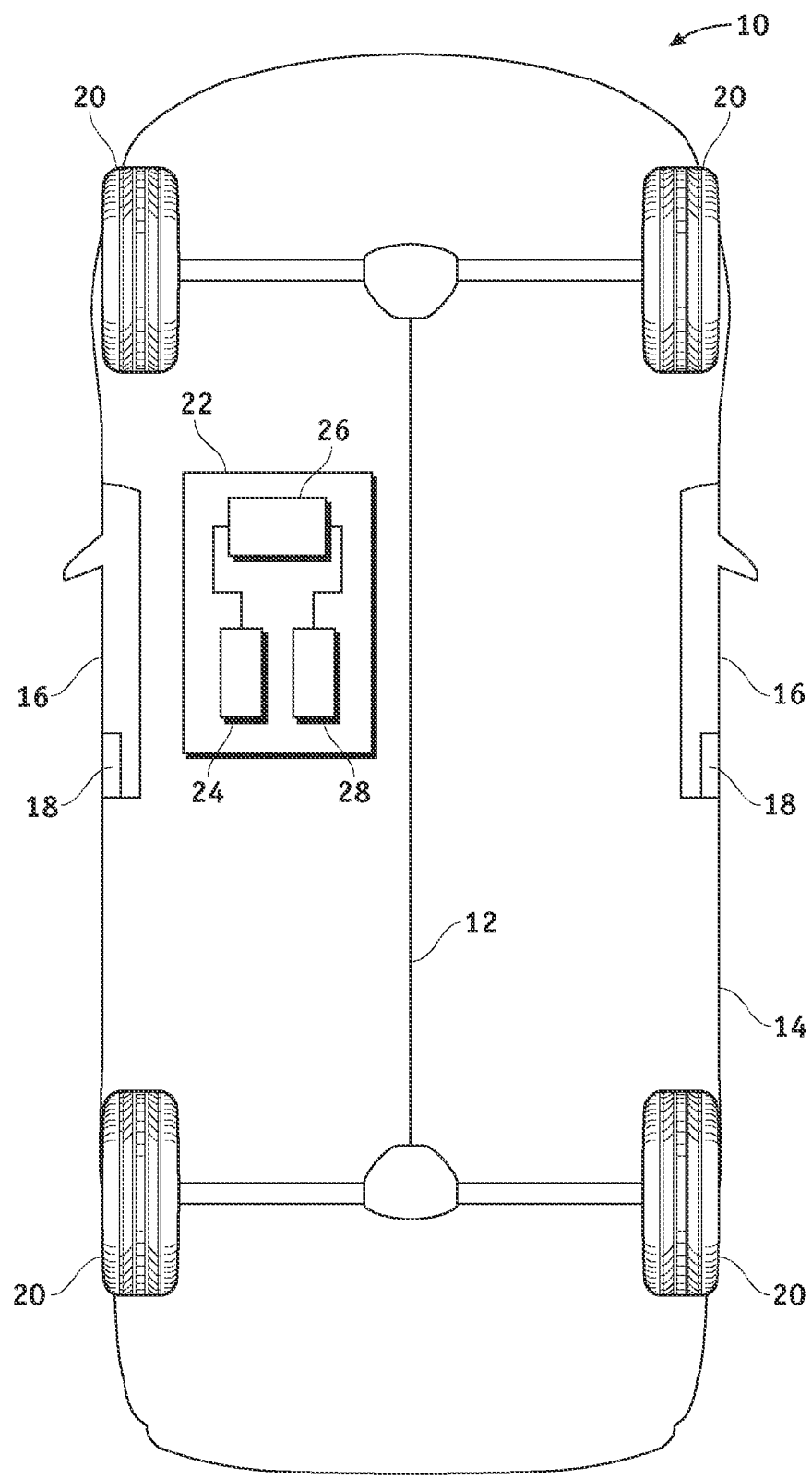
FIG. 1 is a schematic view of an exemplary embodiment of the present invention.

FIG. 1 is a schematic view of an exemplary vehicle 10 according to a first embodiment of the present invention. The vehicle 10 includes a chassis 12, a body 14, at least one vehicle door 16, at least one door lock 18 for locking and unlocking each door 16, and four wheels 20. The vehicle 10 may be any one of a number of different types of vehicles, such as, for example, a sedan, a wagon, a truck, or a sport utility vehicle (SUV), and may be two-wheel drive (2WD) (i.e., rear-wheel drive or front-wheel drive), four-wheel drive (4WD), or all-wheel drive (AWD).

The body 14 and the chassis 12 may jointly form a frame that substantially encloses a passenger compartment, trunk, and the other components of the vehicle 10. The wheels 20 are each rotationally coupled to the chassis 12 near a respective corner of the body 14. The vehicle door 16 may be any type of door of sufficient dimension, weight, and structure for placement on a vehicle. In the illustrated embodiment, the vehicle 10 includes two doors 16, one on each side of the body 14. The vehicle door locks 18 may be locked and unlocked using controls inside the vehicle 10 or a key that is inserted into the door lock 18. In addition, in some embodiments, the vehicle 10 may be equipped with a wireless receiver (not shown) that is suitable for receiving signals from a standard keyless remote control (a "key FOB") that locks and unlocks the doors 16.

In the exemplary embodiment of FIG. 1, the vehicle 10 also includes an electronic control system 22 that is comprised of a number of sensors and system controllers for monitoring and controlling various features and electrical systems of the vehicle 10. As depicted, the electrical control system 22 includes a load sensor 24, an intruder detection control module 26, and an alarm module 28. In addition, although not shown, the electronic control system 22 includes sensors and system controllers, such as a body control module and/or one or more door control modules, that are configured to detect when the vehicle is vacated and the doors (e.g., the doors 16 of FIG. 1) are locked.

FIG. 2 is a block diagram of a system for detecting an intruder inside a vehicle (e.g., the vehicle 10 of FIG. 1) comprising the load sensor 24, intruder detection control module 26, and alarm module 28. It should be understood that the electronic components, circuitry, and/or software that comprise each of these components may be located in a single component, combined with other components, or distributed across multiple components of the vehicle. The load sensor 24 is coupled to the intruder detection control module 26 and provides a plurality of load signals 32 representative of the load in the vehicle. As used herein, the load may include the weight of objects and individuals inside the vehicle (e.g., inside the passenger compartment or trunk). The load sensor 24 may be comprised of a single sensor or a plurality of sensors that work separately or in combination to determine the load in the vehicle. In one embodiment, the load is detected using a vehicle chassis weight sensor that senses the weight of the objects and individuals inside the vehicle. In an alternative embodiment, the load is detected using a chassis height sensor that detects the height of the chassis (e.g., the chassis 12 of FIG. 1).

The intruder detection control module 26 is coupled to the load sensor 24 and the alarm module 28. In addition, the intruder detection control module 26 is in operative communication with other sensors and system controllers, such as a door control module or a body control module that provide signals when the vehicle is vacated and locked. As depicted, the intruder detection control module 26 includes a processor 34 and memory 36. The processor 34 may be a programmable logic control system (PLC), a microprocessor, or any other type of electronic controller known by those skilled in the art. It may be comprised of one or more components of a digital and/or analog type and may be programmable by software and/or firmware, a hardwired state-machine, a combination of these, or any other method known to those skilled in the art. The memory 36 is comprised of electronic memory that is configured to retrievably store instructions and data.

As described in further detail below, the intruder detection control module 26 receives an initial signal from the load sensor 24, representative of an initial load in the vehicle, shortly after the vehicle is vacated and locked, and the intruder detection control module 26 receives subsequent signals, representative of subsequent loads in the vehicle, periodically thereafter. The processor 34 is configured to detect when the load in the vehicle changes by determining the difference between the initial signal and each subsequent signal. If the load changes by more than a predetermined threshold, the intruder detection control module 26 provides an alarm activation signal 38 to the alarm module 28.

In some embodiments, the intruder detection control module 26 provides the alarm activation signal 38 to the alarm module 28 when the load in the vehicle changes by more than a predetermined threshold and the vehicle doors (e.g., the doors 16 of FIG. 1) are unlocked with a door key or key FOB. Further, in other embodiments, the intruder detection control module 26 transmits an alarm activation signal 38 when it determines that the load in the vehicle has changed, and the alarm module 28 activates an audible alarm, as described below, at the time the vehicle doors are unlocked with a door key or a key FOB. These embodiments prevent the intruder from becoming aware of, and disabling, an alarm before the user of the vehicle returns and alert the user of the vehicle while he or she is still outside and, in the case of the key FOB, some distance away from the vehicle.

The alarm module 28 is coupled to the intruder detection control module 26 and is configured to generate an alarm based on the alarm activation signal 38. There are many possible types of alarms. For example, the alarm module 28 may be coupled to one or more actuators on the vehicle's headlights and/or horn that can be activated, causing the headlights to flash and the horn to emit an audible alert. The alarm module 28 may activate some other type an audible alarm (e.g., a siren). As described above, in some embodiments, the alarm module 28 may delay the activation of an audible alarm until another event occurs, such as the user of the vehicle unlocking the doors with a door key or a key FOB. In addition, the vehicle may be equipped with an onboard communication system configured to remotely alert the user of the vehicle, via a cell phone or other personal electronic device, or a third-party, of a possible intruder.

FIG. 3 is a flowchart depicting an exemplary method 40 for detecting an intruder inside a vehicle. During the first step 42, an intruder detection device (e.g., the intruder detection control module 26 of FIG. 2) waits to receive a signal indicating that the vehicle (e.g., the vehicle 10 of FIG. 1) has been vacated and locked. As described above, this signal is transmitted to the intruder detection device by, for example, the body control module or the door control module.

After the intruder detection device receives this signal (at time T1), it waits a predetermined length of time (TP1) to allow the vehicle and its contents to settle (step 44). Preferably, TP1 is long enough to allow any movement or vibrations caused by parking and/or vacating and locking the vehicle to diminish, but short enough to preclude an intruder from entering the vehicle. As depicted in FIG. 3, the intruder detection control device's processor (e.g., the processor 34 of FIG. 2) calculates the difference between the current time (t) and T1. If the difference between t and T1 is greater than or equal to TP1, the intruder detection device proceeds to step 46.

During step 46, the intruder detection device receives a first load signal (L1), representative of the initial load in the vehicle. L1 is generated by a load sensor (e.g., the load sensor 24 of FIG. 2) and includes the weight of the objects and individuals inside the vehicle, the height of the vehicle's chassis (e.g., the chassis 12 of FIG. 1), or any other measurement that is indicative of the load in the vehicle. L1 may be stored in memory (e.g., the memory 36 of FIG. 2).

During step 48 the intruder detection device waits a second predetermined length of time (TP2). TP2 is of sufficient length to permit an intruder to enter the vehicle. As shown in FIG. 3, the processor may perform step 48 by calculating the difference between the current time (t) and the time when step 48 begins (T2), and determining if this difference is greater than or equal to TP2. If the difference is greater than TP2, the intruder detection device proceeds to step 50.

During step 50, the intruder detection device receives a subsequent load signal (L2), representative of the current load in the vehicle, from the load sensor. The processor then determines a difference between L1, measured before an intruder could have entered the vehicle, and L2, measured after an intruder may have entered the vehicle (step 52). In order to eliminate relatively small variations in the load in the vehicle that are most likely the result of non-threatening events such as a small animal sitting on top of or snow accumulating on the vehicle, the processor compares the difference between L2 and L1 with a predetermined threshold (LT). Preferably, LT is set at a level (e.g., seventy-five pounds) indicating that the load in the vehicle has changed by a substantial amount. If the difference between L2 and L1 is greater than or equal to LT, the intruder detection device activates an alarm (step 54). As mentioned above, in some embodiments, the intruder detection device activates the alarm (step 54) only if the difference between L2 and L1 is greater than or equal to LT and the vehicle doors are unlocked using a door key or a key FOB.

Alternatively, if the difference between L2 and L1 is less than LT, then the intruder detection device returns to step 48 and repeats steps 48-52 until the alarm is activated or until the vehicle's doors are unlocked with a door key or key FOB. In one embodiment, every time the difference between L2 and L1 is less than LT, the processor replaces the value of L1 with the value of L2. Thus, the value of L1 is adjusted in step 52 to reflect small variations in the load in the vehicle. In this embodiment, non-threatening conditions, such as snow accumulation, that cause small increases in the vehicle load that, if left to accumulate, might eventually exceed LT, are prevented from producing false alarms.

In alternative embodiments, the method 40 may provide for additional filtering to avoid false alarms. For example, during step 52 the intruder detection device may choose to activate the alarm only if the differences between L1 and a predetermined number of successive subsequent signals, received during successive iterations of step 50, exceed LT. This type of filtering would prevent false alarms caused by, for example, a person sitting or placing a heavy object on the vehicle for a short period of time.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A vehicle security device, comprising:
    a load sensor coupled to a vehicle; and
    a processor coupled to the load sensor, the processor monitoring a load in the vehicle after the vehicle is vacated and locked by receiving first load signal representative of an initial load in the vehicle after the vehicle is vacated and locked, periodically receiving subsequent load signals from the load sensor representative of subsequent loads in the vehicle, replacing the value of the first load signal with the value of one of the subsequent load signals when a difference between the first load signal and the subsequent load signal does not exceed a predetermined threshold, and activating an intruder alarm indicating that an intruder is in the vehicle when the difference between the first load signal and the subsequent load signal exceeds the predetermined threshold.

2. The vehicle security device of claim 1, wherein the load sensor is comprised of a chassis weight sensor, coupled to the vehicle and configured to detect the load in the vehicle.

3. The vehicle security device of claim 1, wherein the load sensor is comprised of a chassis height sensor, coupled to the vehicle and configured to detect a height of the vehicle's chassis.

4. The vehicle security device of claim 1, wherein the processor waits a predetermined length of time after the vehicle is vacated and locked before receiving the first load signal corresponding to the initial load in the vehicle after the vehicle is vacated and locked.

5. The vehicle security device of claim 1, wherein the processor activates the intruder alarm when the difference between the first load signal and at least one of the subsequent signals exceeds the predetermined threshold and the vehicle's doors are unlocked using a door key or a keyless remote control.

6. The vehicle security device of claim 1, wherein the processor activates the alarm only when the differences between the first load signal and at least two successive signals exceed the predetermined threshold.

7. The vehicle security device of claim 1, wherein the processor activates an alarm when the differences between the first load signal and at least two successive signals exceed the predetermined threshold and the vehicle's doors are unlocked using a door key or a keyless remote control.

8. The vehicle security device of claim 1, further comprising:
    an onboard communication system coupled to the processor, and
    a personal electronic device, for use by an operator of the vehicle, the personal electronic device receiving a wireless signal from the onboard communication system when the processor determines that the difference between the first signal and at least one of the subsequent signals exceeds the predetermined threshold.

9. A method for detecting an intruder inside a vehicle, comprising:
    monitoring a load in the vehicle after the vehicle is vacated and locked, the monitoring comprising receiving an first load signal representing an initial load in the vehicle after the vehicle is vacated and locked, periodically receiving subsequent load signals representative of subsequent loads in the vehicle, and replacing the value of the first load signal with the value of the subsequent signal if a difference between the first load signal and the subsequent load signal does not exceed the predetermined threshold; and
    signaling, via an intruder alarm, that the intruder is in the vehicle when the difference between the first load signal and the subsequent signal exceeds the predetermined threshold.

10. The method of claim 9, further comprising signaling the intruder alarm when the difference between the first load signal and the subsequent signal exceeds the predetermined threshold and the vehicle's doors are unlocked using a door key or a keyless remote control.

11. A system for detecting an intruder inside a vehicle, the system comprising:
    a load sensor coupled to the vehicle;
    an alarm module that activates an intruder alarm; and
    an intruder detection control module coupled to the load sensor and to the alarm module, the intruder detection control module comprising a processor receiving an first load signal representative of an initial load in the vehicle from the load sensor after the vehicle is vacated and locked, periodically receiving subsequent load signals from the load sensor representative of subsequent loads in the vehicle, replacing the value of the first load signal with the value of the subsequent signal if a difference between the first load signal and the subsequent load signal does not exceed the predetermined threshold, and activating the intruder alarm indicating that an intruder is in the vehicle when the processor determines that the difference between the first load signal and at least one of the subsequent signals exceeds a predetermined threshold.

12. The system of claim 11, the intruder detection control module further configured to transmit a signal to the intruder alarm module resulting in the activation of the intruder alarm when the processor determines that the difference between the first load signal and at least one of the subsequent signals exceeds a predetermined threshold and the vehicle doors are unlocked using a door key or a keyless remote control.

* * * * *